US006993097B2

(12) United States Patent
Hammes et al.

(10) Patent No.: US 6,993,097 B2
(45) Date of Patent: Jan. 31, 2006

(54) DEMODULATION METHOD AND DEMODULATOR FOR CPFSK-MODULATED SIGNALS

(75) Inventors: Markus Hammes, Duisburg (DE); Michael Speth, Aachen (DE); André Neubauer, Krefeld (DE); Michael Madden, Mountain View, CA (US)

(73) Assignee: Infineon Technologies AG, Munich (DE)

( * ) Notice: Subject to any disclaimer, the term of this patent is extended or adjusted under 35 U.S.C. 154(b) by 742 days.

(21) Appl. No.: 09/925,166

(22) Filed: Aug. 8, 2001

(65) Prior Publication Data

US 2002/0060604 A1    May 23, 2002

(30) Foreign Application Priority Data

Aug. 8, 2000    (DE)    ............................... 100 38 681

(51) Int. Cl.
    H03D 3/10        (2006.01)
(52) U.S. Cl. ...................... 375/334; 375/272; 375/341; 329/300
(58) Field of Classification Search ................ 375/341, 375/262, 279, 334, 272; 329/300
    See application file for complete search history.

(56) References Cited

U.S. PATENT DOCUMENTS 4,603,393 A    7/1986    Laurent et al.
5,432,821 A    7/1995    Polydoros et al.
6,785,348 B2 *  8/2004    Hammes et al. ............ 375/334

OTHER PUBLICATIONS

Pierre A. Laurent: "Exact and Approximate Construction of Digital Phase Modulations by Superposition of Amplitude Modulated Pulses (AMP)", IEEE Transactions on Communications, vol. Com-34, No. 2, Feb. 1986, pp. 150-160.
K.D. Kammeyer.: Nachrichtenübertragung (message transmission), published by G. Teubner Verlag, 1996, Chapter 12.1.5, "Coherent Demodulation of CPM Signals" pp. 422 and 423.
Colavolpe, G. et al.: "Noncoherent Sequence Detection of CPM", Electronics Letters, vol. 34, No. 3, Feb. 5, 1998, pp 259-261.
Baier, A.: "Derotation Techniques In Receivers For MSK-Type CPM Signals", Elsevier Science Publishers B.V., Bd. 3, Sep. 18, 1990, pp. 1799-1802.

* cited by examiner

*Primary Examiner*—Temesghen Ghebretinsae
(74) *Attorney, Agent, or Firm*—Laurence A. Greenberg; Werner H. Stemer; Ralph E. Locher

(57) ABSTRACT

In a method for estimating a sequence of input data symbols of a CPFSK-modulated data signal transmitted via a faulty channel, in the course of an ACS operation for calculating a transition metric value, an estimated value is determined for the replacement symbol occurring during the linear approximation of the CPFSK. That estimated value is considered in calculating the transition metric value.

13 Claims, 4 Drawing Sheets

DEMODULATION METHOD AND DEMODULATOR FOR CPFSK-MODULATED SIGNALS

BACKGROUND OF THE INVENTION

FIELD OF THE INVENTION

The invention lies in the telecommunications field and relates, more specifically, to a method and a device for estimating a sequence of input data symbols of a CPFSK-modulated data signal transmitted via a faulty channel.

A multiplicity of digital types of modulation are known which are based on amplitude shift keying (ASK), frequency shift keying (FSK), or phase shift keying (PSK), and mixtures of the same. What are termed CPM types of modulation (CPM: Continuous Phase Modulation) with continuous phase are used in digital communication systems for reasons of frequency economy. FSK with continuous phase is noted as CPFSK (Continuous Phase FSK). An example of this is Gaussian minimum shift keying (GMSK), which is used, for example, in the pan European mobile radio standard GSM (Global System for Mobile Communications).

The originally non-linear CPFSK modulation can be described approximately as linear modulation. The linear approximation on which this property is based is specified in the article entitled "Exact and Approximate Construction of Digital Phase Modulations by Superposition of Amplitude Modulated Pulses (AMP)" by Pierre A. Laurent, IEEE Trans. Commun., Vol. COM-34 (1986), pages 150–160.

The demodulation of a CPFSK-modulated data signal transmitted via a distortionless and interference-free channel is described, for example, in the book entitled "Nachrichtenübertragung" ["Telecommunication"] by K. D. Kammeyer, B. G. Teubner Verlag, Stuttgart 1996, chapter 12.1.5., pages 422 and 423. Given a modulation index $\eta$ of 0.5 or a multiple of 0.5, all that is required is to sample the in phase and quadrature branches of the received signal (because of the 90° phase offset between these branches), and compare the samples obtained with the corresponding complex-value representations of the CPFSK replacement symbols on which the linear approximation is based. Determined, as input data symbol actually sent, from the possible input data symbols is the one whose complex-value replacement symbol comes closest (assuming a known initial phase) to the two measured samples (real and imaginary parts).

This coherent demodulation method for CPFSK signals can be generalized without problems to rational modulation indices $\eta=m1/m2$ (m1 and m2 being integral), since a finite number of states of the replacement symbols always exists in the case of rational modulation indices, and so the demodulation and (continue to) be performed by a comparison of the samples with the aid of the finite modulation alphabet of the replacement symbols.

However, there is no longer any finite modulation alphabet of the replacement symbols for non-rational modulation indices $\eta$. As a result of this, the conventional method for coherent CPFSK demodulation can no longer be carried out.

A similar statement holds for a distorting transmission channel wherein intersymbol interference (ISI) during demodulation must be taken into account: as long as a rational modulation $\eta$ is used, the demodulation of the data signal transmitted via the distorted channel, for example by means of the known Viterbi algorithm (VA), succeeds. In the case of VA (which will be explained in more detail later) a state diagram (what is termed a trellis diagram) is created in accordance with the power of the replacement symbol alphabet and the extent to which the ISI is taken into account (that is to say the length L of the channel memory), and a transmitted data sequence is determined as the shortest path through the trellis diagram. If the modulation index $\eta$ is an irrational number, the realization or implementation of a VA is impossible, however, because an infinitely large number of trellis states would have to be taken into account.

A general problem (that is to say one not limited to the CPFSK form modulation considered here) in the demodulation of a data signal transmitted via a faulty, ISI-affected channel resides in the presence of unknown parameters in the receiver. In principle, the unknown parameters can be both channel parameters (for example the channel pulse responses) and function parameters of a transmitter. Various methods are known for estimating unknown parameters (with reference to the transmitter and/or channel states) in the VA demodulation in the receiver. The classical mode of procedure is represented by DFE (Decision Feedback Equalization) techniques. In this case, the same, estimated (incompletely known) parameters are used for all possible transition switching in two consecutive time steps in the trellis for which transition metrics are to be calculated, and these universal parameters are estimated with the aid of a fed back "provisional" sequence, present with a delay of a few time steps, of demodulated data symbols which—depending on the delay selected—already corresponds more (long delay) or less (short delay) effectively to the sequence of input data symbols for which a search is being made. No further detail will be given here on the known DFE techniques, although it may be mentioned that a principle problem of this technique consists in estimating unknown parameters by using fed back "provisional" result data in conjunction with selection of a short delay is critical, because the error rate on the provisional result data can then still be too high and can become unsatisfactory on selection of a longer delay time, because then the estimated parameters (for example channel pulse responses) are already obsolete at the instant of the estimation.

Another possibility for carrying out the VA given the presence of unknown parameters is described in U.S. Pat. No. 5,432,821. That method, denoted as Per-Survivor Processing (PSP) is based on the idea of undertaking for each path followed in the trellis diagram and progressed step by step a separate or individual estimation of the unknown parameters based on variables which are assigned only to this considered path—and are therefore already calculated at the instant of the estimation—and to take this estimate into account when calculating the transition metrics. This mode of procedure, which is explained in U.S. Pat. No. 5,432,821 for the example of estimating channel parameters, has the advantage that there is no need for any time-delayed sequence of provisionally decided result data to be calculated and fed back.

SUMMARY OF THE INVENTION

The object of the present invention is to provide a demodulation method and demodulator for CPFSK-modulated signals which overcome the above-noted deficiencies and disadvantages of the prior art devices and methods of this general kind, and which enables demodulating a sequence of input data symbols of a CPFSK-modulated data signal, transmitted via a faulty channel, which permits a non-rational modulation index to be used at the transmitter end and, in particular, also permits deficient demodulation in the case of the presence of unknown parameters.

With the above and other objects in view there is provided, in accordance with the invention, a method of estimating a sequence of input data symbols of a CPFSK-modulated data signal, transmitted via a faulty channel, which comprises:

repeatedly executing an ACS operation and thereby calculating a transition metric value with reference to a transition from a precursor state at a time step n to a target state at a time step n+1, by determining a first estimated value for a replacement symbol, occurring in a linear approximation of the CPFSK, with reference to an n−1th time step, and taking the first estimated value into account in a calculation of the transition metric value.

In accordance with an added feature of the invention, the first estimated value is determined by using the first estimated value determined in a preceding time step.

In accordance with an additional feature of the invention, the first estimated value is separately determined for each precursor state, specifically on a basis of decisions on input data symbols taken on the path $(P(Z_n^i))$ leading to the respective precursor state $(Z_n^i)$.

In accordance with another feature of the invention, the first estimated value is determined using the equation $$\hat{a}_{n-1}^{(i)} = \hat{a}_{n-2}^{(i)} \exp\left\{j\pi\eta d_{n-1}^{P(Z_n^1)}\right\},$$

whereby $\hat{a}_{n-1}^{(i)}$ and $\hat{a}_{n-2}^{(i)}$ are the first estimated values for the n−1th and n−2th replacement symbol, respectively, relating to the precursor state with index i, $$d_{n-1}^{P(Z_n^1)}$$

is an input data symbol, decided in the receiver, with reference to a path leading to the respective precursor state $Z_n^i$, and $\eta$ denotes the modulation index.

In accordance with again an added feature of the invention, a second estimated value is determined for a phase correction of a reconstructed signal value determined for calculating the transition metric value by using the first estimated value, and the second estimated value is considered in calculating the transition metric value.

In accordance with again an additional feature of the invention, a second estimated value i separately determined for each precursor state, specifically on a basis of decisions on input data symbols taken on the path $(P(Z_n^1))$ leading to the respective precursor state $(Z_n^i)$.

In accordance with a further feature of the invention, the step of determining the second estimated value comprises calculating a phase difference between a reconstructed signal value and a value of the received data symbol.

With the above and other objects in view there is also provided, in accordance with the invention, a device for estimating a sequence of input data symbols of a CPFSK-modulated data signal transmitted via a faulty channel, comprising:

a device configured to carry out ACS operations;

a calculating unit for calculating a transition metric value with reference to a transition from an precursor state at a time step n to a target state at a time step n+1, and estimating means for determining a first estimated value for a replacement symbol, occurring in a linear approximation of a CPFSK, with reference to an n−1th time step, the estimating means being connected to the calculating unit for communicating the first estimated value to the calculating unit.

In accordance with yet an added feature of the invention, the estimating means is configured to carry out the determination of the first estimated value by using the first estimated value determined in a preceding time step.

In accordance with yet an additional feature of the invention, the estimating means comprises a multiplicity of calculating sections, and each calculating section is configured to carry out a separate calculation of a second estimated value for the n−1th replacement symbol on a basis of decisions taken on input data replacement symbol on the basis of decisions taken on input data symbols for a path $(P(Z_n^i))$ leading to the respective precursor state $(Z_n^i)$ under consideration.

In accordance with yet another feature of the invention, each calculating section is configured to carry out the calculation of the first estimated value using the equation $$\hat{a}_{n-1}^{(i)} = \hat{a}_{n-2}^{(i)} \exp\left\{j\pi\eta d_{n-1}^{P(Z_n^1)}\right\},$$

where $\hat{a}_{n-1}^{(i)}$ and $\hat{a}_{n-2}^{(i)}$ respectively are the first estimated value for the n−1th and n−2th replacement symbols relating to the precursor state of index $$d_{n-1}^{P(Z_n^1)}$$

is an input data symbol decided in the receiver with reference to the path leading to the precursor state $(Z_n^i)$ under consideration, and $\eta$ denotes the modulation index.

In accordance with yet a further feature of the invention, the estimating means are first means and the device further comprises second means for determining a second estimated value for a phase correction of a reconstructed signal value determined for calculating the transition metric value by using the first estimated value.

In accordance with a concomitant feature of the invention, the second means comprise a multiplicity of calculating sections; and each calculating section is configured to carry out a separate calculation of a second estimated value for the n−1th replacement symbol on a basis of decisions taken on input data symbols for the path $(P(Z_n^i))$ leading to the respective precursor state $(Z_n^i)$ under consideration.

An important aspect of the invention consists in using a first estimated value for the placement symbol occurring in the preceding time step n−1 during the linear approximation of the CPFSK in order to calculate the transition metric value for a transition between the time steps n and n+1. Thus, in the time step n the state of the transmitter in the time step n−1 is estimated and the calculation of the reconstructed signal value is carried out on the basis of this estimated transmitter state. This mode of procedure according to the invention is also denoted below as TST (Transmitter State Tracking). Since the transmitter state (lying one time step back) (that is to say the appropriate replacement symbol) is estimated, the presence of a finite modulation alphabet is not required. For a method according to the invention is therefore also suitable for using irrational modulation indices.

The determination of the first estimated value is preferably performed by using the first estimated value determined in the preceding time step, that is to say it is possible to speak of an incremental determination of the first estimated value.

Furthermore, it is preferred to determine a second estimated value, which represents a phase correction of the reconstructed signal value required for calculating the transition metric value. This opens up the possibility of carrying out the TST demodulation method even without exact knowledge of parameters which effect a phase error in the reconstructed signal value.

A first example for such a parameter is the modulation index $\eta$. If the modulation index $\eta$ in the receiver is not known, or not known exactly, this has the consequence that a phase shift occurs between the actual transmitter state and the directed transmitter state estimated in accordance with the TST method. Since the corrected transmitter state features in the calculation of the reconstructed signal value and thus in the calculation of the transition metric value, this would impair the demodulation performance. An efficient signal demodulation is rendered possible by the determination of the second estimated value for a phase correction of the reconstructed signal value, even in the case of a modulation index $\eta$, which is not known, or not known exactly, at the receiver end.

A further example for such a parameter is—for the case that the frequency modulation is undertaken relative to a carrier frequency and, at the receiver end, the shift by the carrier frequency is nullified by downward mixing—is a frequency offset between the carrier frequency, used for upward mixing, of a transmitter and the carrier frequency, used for downward mixing, of the receiver. This frequency offset, which can also be effected by a drift of one or both mixing frequencies, likewise acts as a phase error in the reconstructed signal. Thus, in addition to elements of the modulation index in the receiver it is also possible by means of the concept according to the invention to take into account frequency offsets and/or frequency drifts between the transmitter and the receiver.

This second estimated value is preferably determined for the nth time step by calculating the phase difference between the reconstructed signal value and a value of a received data symbol. It is possible thereby to update the second estimated value in each time step and to take account of it in calculating the transition metric value for the corresponding path.

Other features which are considered as characteristic for the invention are set forth in the appended claims.

Although the invention is illustrated and described herein as embodied in a demodulation method and a demodulator for CPFSK-modulated signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
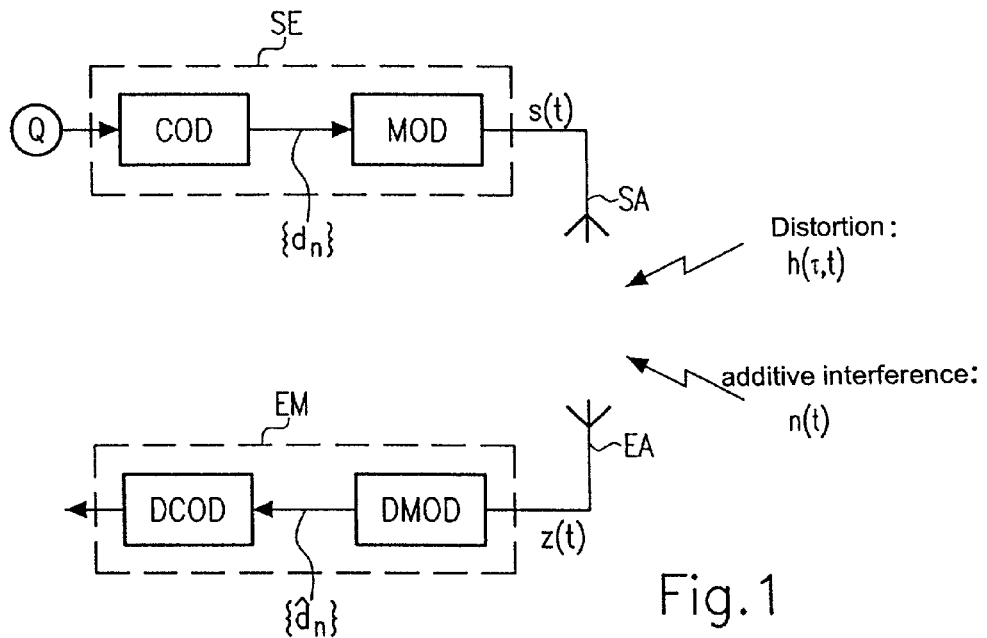
FIG. 1 is a block diagram explaining the principle of the structure of a digital transmission system.

Referring now to the figures of the drawing in detail and first, particularly, to FIG. 1 thereof, there is illustrated the known principle of a design of a digital transmission system such as is used, for example, in mobile radio for signal transmission.

A transmitting device SE accepts an analog source signal Q (generated by a microphone, for example) and leads it to a coder COD. The coder COD comprises, in a way not illustrated, an analog-to-digital converter for digitizing the source signal Q, and can also contain a source coder, a channel coder, an interleaver and a block former which, in a suitable way, compress the digitized source signal Q, provided with error protection coding, interleave it and subdivide it into data blocks.

The coder COD outputs a digital data signal which comprises a symbol sequence $\{d_n\}$ of the data symbols $d_0$, $d_1, \ldots$, which are based, for example, on the value set $\{-1, 1\}$. The symbol sequence $\{d_n\}$ is fed to a modulator device MOD which modulates a high-frequency carrier as a function of the symbol sequence $\{d_n\}$. The modulated, time-dependent, real transmitted signal s(t) calibrated in this case is fed into a transmission channel, that is to say emitted as radio signal via a transmit antenna SA, for example.

The data symbols $d_0, d_1, \ldots$ are denoted below as input data signals (for the modulator device).

Signal distortions and signal interference, both of which depend on the type of transmission channel, can occur during transmission of the transmitted signal s(t) via the transmission channel.

The distorting influence of the transmission channel is described by a channel pulse response $h(\tau,t)$. The additive interference component superimposed on the distorted signal is described by means of a function n(t). A time-continuous received signal z(t) received at the receiver EM is thereby yielded as $$z(t) = \int_0^\infty h(\tau, t) \cdot s(t-\tau) d\tau + n(t) \tag{1}$$

The receiver EM receives the (distorted and interfered) real received signal z(t) present at the output of a transmission channel, for example via a receive antenna EA. The received signal z(t) is fed to a demodulator DMOD. The latter demodulates the received signal z(t). Ready at the output of the demodulator DMOD is a symbol sequence $\{\hat{d}_n\}$ whose elements $\hat{d}_n$ are estimated values of the associated input data symbols $d_n$. The decoding of the demodulated symbol sequence $\{\hat{d}_n\}$ is performed in a decoder DCOD arranged on the output side of the demodulator DMOD.

Figure 2:
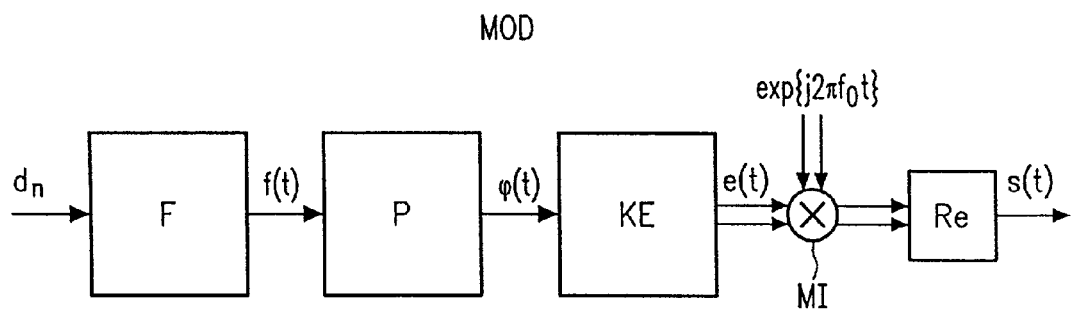
FIG. 2 is a block diagram explaining the mode of operation of a binary CPFSK modulator according to the prior art.

In order to explain the CPFSK modulation, FIG. 2 shows the structure of a known CPFSK modulator device MOD in the form of a block diagram. Here, FIG. 2 indicates real variables by a single arrow and complex variables by a double arrow.

In the signal path, the CPFSK modulator MOD has a filter, a phase accumulator P, a device KE for generating a complex envelope e(t), a mixing stage MI and a device Re for forming the real part of an incoming signal. The (real) modulated signal s(t) is available at the output of the last named device Re.

Let the filter F have the real pulse response g(t). The pulse response g(t) is designated below as baseband pulse. The pulse shape and the (temporal) length of the base and pulse g(t) define the CPFSK-modulation.

It is known that the various pulse shapes, for example square-wave pulses, $\cos^2$ pulses, or else Gaussian pulses can be used as baseband pulse.

The pulse length T·K of the baseband pulse g(t) (that is to say the time duration over which the baseband pulse g(t) has a non-vanishing value) can extend over K=1, 2, 3, . . . symbol time durations T. Full response types of modulation are spoken of in the case of K=1. If the baseband pulse g(t) extends over a plurality of symbol time durations (that is to say K=2, 3, . . .), what are known as partial response types of modulation are generated.

The real pulse-amplitude-modulated frequency signal f(t) occurring at the output of the filter F is a linear superimposition of time-shifted versions of g(t) weighted with the symbols $d_n$ of the input data symbol sequence $\{d_n\}$:

$$f(t) = \sum_n d_n g(t - nT) \quad (2)$$

The pulse-amplitude-modulated frequency signal f(t) is integrated in the phase accumulator P to form the phase signal φ(t). In the device KE for generating the complex envelope e(t), the latter is calculated form the phase signal φ(t) in accordance with the equation $$e(t) = \exp\{j(\phi(t) + \phi_0)\} \quad (3)$$

Here, j denotes the imaginary unit and $\phi_0$ an integration constant. Consequently, the complex envelope e(t) is yielded in accordance with:

$$e(t) = \exp\left\{ j\left(2\pi\Delta F \int_{-\infty}^{t} f(\tau) d\tau \right)\right\} \quad (4)$$

Here, ΔF denotes the frequency deviation occurring during modulation. The modulation index η is defined in the usual way by η=2ΔFT.

The complex envelope e(t) is then multiplied in the mixer stage MI by the high-frequency carrier of the frequency $f_0$. The real part (Re) of the upwardly mixed signal is the modulated transmitted signal s(t).

In accordance with the already mentioned article by P. A. Laurent, the preliminary nonlinear CPFSK modulation can be represented approximately as a linear modulation by using replacement symbols $a_n$ instead of the input data symbols $d_n$:

$$e(t) \approx \sum_n a_n \cdot C_0(t - nT) \quad (5)$$

There exist between what is termed the elementary pulse $C_0(t)$ and the baseband pulse g(t) a known, functional relationship which permits the associated elementary pulse $C_0(t)$ to be determined for a given type of CPFSK modulation (that is to say for a given baseband pulse g(t)). Reference may be made to the already mentioned article by P. A. Laurent in this regard.

The following relationship exists between the replacement symbols $a_n$ and the input data symbols $d_n$:

$$a_n = \exp\left\{ j\pi\eta \sum_{i=-\infty}^{n} d_i \right\} \quad (6)$$

Each replacement symbol therefore results from the accumulator input data symbols.

Equation (6) shows that the finite number of replacement symbols exists only for the case of a rational modulation index η. Also following from equation (6) is the relationship:

$$a_n = a_{n-1} \exp\{j\pi\eta d_n\} \quad (7)$$

Figure 4A:
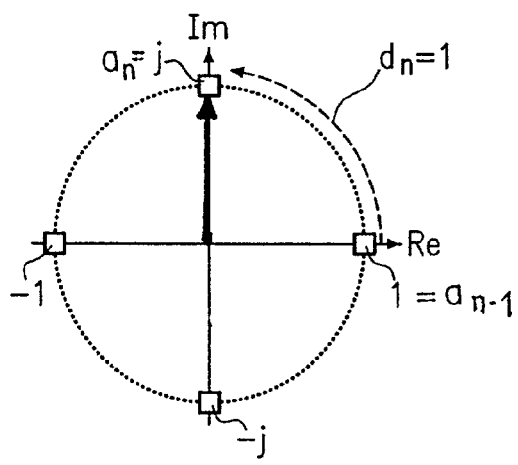
FIG. 4a is a vector or signal space representation of the possible replacement symbols in the case of CPFSK with a modulation index $\eta=0.5$.
Figure 4B:
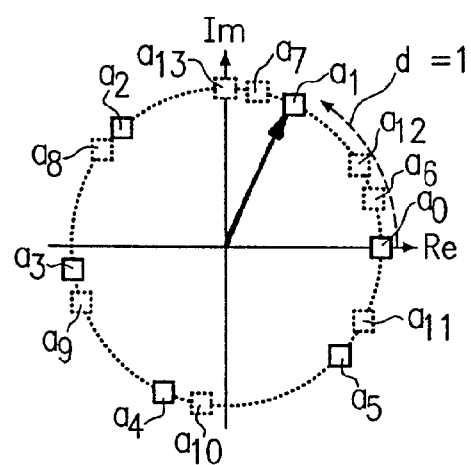
FIG. 4b is a vector or signal space representation of the possible replacement symbols in the case of CPFSK with an irrational modulation index $\eta$.

FIG. 4a shows a vector or signal space representation of the possible replacement symbols $a_n$ in the case of CPFSK with a modulation index η=0.5. The real part is plotted on the x-axis, and the imaginary part is plotted on the y-axis. It is clear that four states exist in the case of η=0.5, that is to say the replacement symbols $a_n$ (given an initial phase of 0) can assume only four values 1, j, −1, −j for $d_n$=1 or −1. These four values $a_n$ are denoted as modulation alphabet. Let $a_{n-1}$=1 by way of example. The state transition relating to $a_n$=j and illustrated by the dashed arrow is generated by an input data symbol $d_n$=1. The value of the replacement symbol relating to the time step n describes the state of the transmitter. It is determined by the sequence of the input data symbols.

The basic structure, known per se, of a demodulator DMOD for demodulating a CPFSK signal is firstly explained below with the aid of FIG. 3 for the case of an ISI-affected transmission channel with additive noise. The demodulator DMOD is to determine the input data symbol sequence $\{d_n\}$ from the received signal z(t). Complex variables are represented, in turn, by a double arrow.

The demodulator DMOD can comprise a mixing stage MI which is operated at the frequency $f'_0$ ($f_0 = f'_0$ holding ideally), and which serves to mix the received signals z(t) downward into the baseband. However, the received signal z(t) can also be processed in the bandpass region at a suitably selected intermediate frequency.

A lowpass filter TF is used for bandwidth limitation. After filtering, the downwardly mixed, filtered received signal z(t) is sampled with the aid of an analog-to-digital converter ADC. The sampling is performed at least with the symbol clock 1/T.

A sequence $\{y_n\}$ comprising complex samples $y_n$ is ready at the output of the ADC.

The sequence $\{y_n\}$ of complex samples are fed to a Viterbi equalizer VIT. The Viterbi equalizer VIT comprises a channel estimator KS and an ACS (Add-Compare-Select) calculating unit ACS. The complex sampling symbols $y_n$ are input into both.

Figure 5:
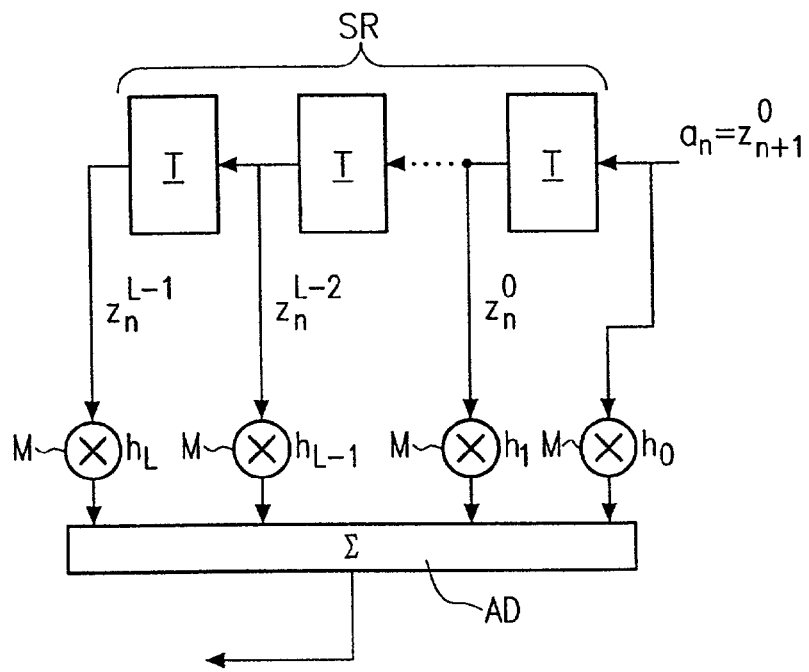
FIG. 5 is an equivalent circuit diagram of a distorting transmission channel.

In a simple model, see FIG. 5, wherein the transmission channel is described as a finite, clocked automatic machine, the samples $y_n$ can be expressed in accordance with $$y_n = \sum_{l=0}^{L} a_{n-l} h_l + n_n \quad (8)$$

as a time-discrete convolution of the current and the last L transmitted replacement symbols with L+1 channel pulse responses $h_0, h_1, \ldots, h_L$, plus an interference symbol sequence $\{n_n\}$, comprising interference symbols $n_n$, representing the additive interference $n(t)$. The automatic machine comprises a shift register SR consisting of L memory cells T. Located upstream and downstream of each memory cell T in each case are taps (a total of L+1 items) which lead to multipliers M which multiply the values of the data symbols by a channel pulse response $h_0, h_1, \ldots, h_L$ in each case. The output stage of the automatic machine is implemented by an adder AD which adds up the outputs of the L+1 multipliers.

The replacement symbol $a_n$ is fed on the input side to the shift register SR at the nth time step. At this moment, the memory cells of the shift register SR store the previously input replacement symbols $(a_{n-L}, \ldots, a_{n-2}, a_{n-1})$. With each time step, there is generally change in the memory contents of each memory cell, since the stored replacement symbol is shifted into the next memory cell T.

As regards the receiver-end reconstruction of a replacement symbol sequence $\{a_n\}$ comprising p+1 elements (p being a positive integer), MLSE (Maximum-Likelihood Sequence Estimation) state that one $\{â_n\}$ of the possible (p+1)-element replacement symbol sequences $\{a_n\}$ whose symbols, weighted with the channel pulse responses $ĥ_0, ĥ_1, \ldots, ĥ_L$, and the smallest Euclidean distance from the sequence of the measured samples $y_n$ is to be determined in the receiver as sequence conjectured to have been transmitted. The condition for the (p+1)-element replacement symbol sequence $\{â_n\}$ for which a search is being made is therefore:

$$\sum_{n=0}^{L+p} \left( y_n - \sum_{l=0}^{L} a_{n-l} ĥ_l \right)^2 = \text{Minimum for } \{a_n\} = \{â_n\} \quad (9)$$

The basic idea of the Viterbi algorithm (VA) consists in recursively solving the MLSE condition equation (9).

The memory contents of the shift register SR, and an accumulated initial phase $$\phi_{n-L-1} = \pi\eta \sum_{l=-\infty}^{n-L-1} d_l$$

are used in the case of the conventional VA demodulation of a CPFSK-modulated signal in order to define a combined transmitter and channel state in a trellis state diagram. This state is described by the (L+1l)-tuple $A_n=(\phi_{n-L-1}; a_{n-L}, \ldots, a_{n-2}, a_{n-1})$ for the replacement symbols $a_{n-L}, \ldots, a_{n-2}, a_{n-1}$ whilst occurring. This state is unknown in the receiver.

In general, the combined transmitter and channel state can be described in the time step n by the (L+1)-tuple $Z_n=(\phi_n Z_n^{L-1}, \ldots, Z_n^1, Z_n^0)$, the memory contents of the input-end first memory cell T in the time step n being denoted by the variable $Z_n^0$, the memory contents of the downstream memory cells T in the time step n being denoted by the variables $Z_n^1, \ldots, Z_n^{L-1}$ and the initial phase $\phi_{n-L-1}$ being denoted by the variable $\phi_n$. Each of the variables $Z_n^{L-1}, \ldots, Z_n^1, Z_n^0$ can assume the values of the modulation alphabet (that is to say the values of the replacement symbols in the case of the conventional VA).

The transmitted sequence $\{a_n\}$ determines a path through the trellis diagram. In the trellis diagram all possible states $Z_n$, or a suitable selection of possible states (reduced trellis diagram) are plotted against the time step n in each case. The VA determines the sequence $\{A_n\}$ of the states by means of the trellis diagram in order to estimate the transmitted sequence $\{a_n\}$. The path, determined by means of the sequence $\{A_n\}$, through the trellis diagram is denoted as best or "shortest" path through the trellis diagram.

Figure 6:
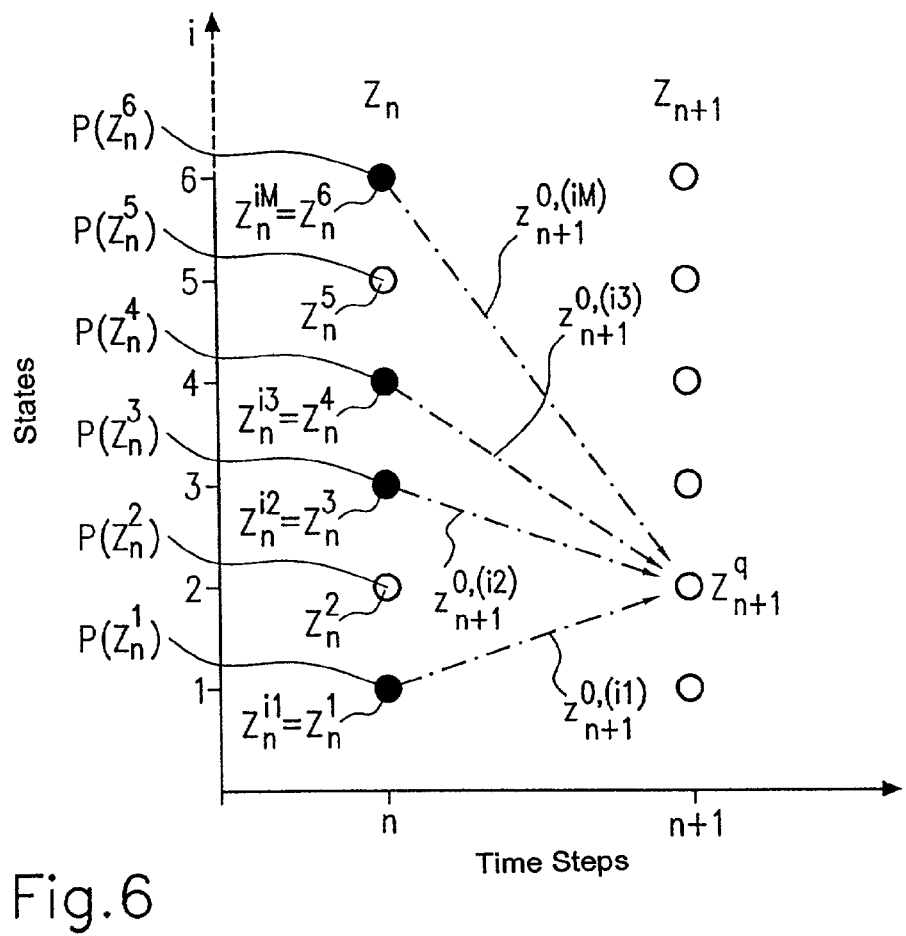
FIG. 6 is a section from a trellis diagram explaining the Viterbi equalization.

FIG. 6 shows a detail of the trellis diagram for the two-time steps n and n+1 with reference to the example of an M-stage replacement symbol data signal and a rational modulation index (M=4 was selected for the representation in accordance with FIG. 4a). Each circle represents one of the states taken into account in the trellis diagram considered. The states relating to the time step n are denoted by $Z_n^1, Z_n^2, \ldots$, in general by $Z_n^i$. A corresponding notation is used for the possible states relating to the time step n+1.

Each state relating to the time step n+1 can be reached by M transitions starting from M different precursor states relating to the time step n. Consideration is now given to those M possible precursor states relating to the time step n which lead to a specific state $Z_{n+1}^q$, denoted by the index q, in relation to the time step n+1. For each of these M possible precursor states $Z_n^{i1}, Z_n^{i2}, \ldots, Z_n^{iM}$ relating to the time step n, which are illustrated in FIG. 6 in bold (that is to say it is the case in FIG. 6 that i1=1, i2=3, i3=4 and iM=i4=6), the shortest path $P(Z_n^{i1}), P(Z_n^{i2}), P(Z_n^{i3})$ and $P(Z_n^{iM})$ leading to this state where already determined during the preceding recursion. As already mentioned, these shortest paths are represented in each case by the sequence of the precursor states lying on the path, that is to say $P(Z_n^i)=\{Z_0^a, Z_2^b, Z_3^c, \ldots, Z_n^i\}$, a, b, c being the indices of the corresponding states.

The question is which of these M paths, which lead to the possible precursor states $Z_n^{i1}, Z_n^{i2}, \ldots, Z_n^{iM}$ is the one, which builds up the shortest path $P(Z_{n+1}^q)$ to this state $Z_{n+1}^q$ when it is continued to the considered state $Z_{n+1}^q$ in the time step n+1.

In order to answer this question, a transition metric value (or metric increment) $I(Z_n^{i1}, Y_n), I(Z_n^{i2}, Y_n), \ldots, I(Z_n^{iM}, Y_n)$ is calculated in the case of the VA for each of the transitions considered (between one of the possible precursor states $Z_n^{i1}, Z_n^{i2}, \ldots, Z_n^{iM}$ and the target state $Z_{n+1}^q$ considered), specifically in accordance with:

$$I(Z_n^i, y_n) = \left(y_n - \sum_{l=1}^{L} z_n^{l-1,(i)} \hat{h}_l - a_n^{(i\to q)} \hat{h}_0\right)^2 \quad (10)$$

$i = i1, i2, \ldots, iM$.

Using the notation already introduced, in this case the M possible, known precursor states are described in each case by an (L+1)-tuple $$Z_n^i = (\tilde{\phi}_n; z_n^{L-1,(i)}, \ldots, z_n^{1,(i)}, z_n^{0,(i)}), \, i = i1, i2, \ldots, iM,$$

and $$a_n^{(i\to q)}$$

denotes that replacement symbol which transfers the precursor state with index i into the target state with index q, that is to say it holds that $$z_{n+1}^{(0(q))} = a_n^{(i\to q)}.$$

Because of the recursive mode of calculation, a minimal metric $Me(Z_n^{i1})$, $Me(Z_n^{i2})$, ..., $Me(Z_n^{iM})$ has already been calculated relative to the time step n for each of the M possible precursor states $Z_n^{i1}$, $Z_n^{i1}$, ..., $Z_n^{iM}$. The path decision process for the time step n is carried out on the basis of these known M minimal metrics $Me(Z_n^{i1})$, $Me(Z_n^{i2})$, ..., $Me(Z_n^{iM})$ of the possible precursor states and the calculated M transition metric values $I(Z_n^i)$ for the respective transitions. It comprises three steps:

The M candidates, denoted by $me^i(Z_{n+1}^q)$, for the minimum metric of the target state $Z_{n+1}^q$ considered are calculated by means of an addition step ("ADD") as the sum respectively of the minimum metric of one of the precursor states, and of the associated metric increment, doing so in accordance with $$me^i(Z_{n+1}^q) = Me(Z_n^i) + I(Z_n^i, y_n), \, i = i1, i2, \ldots, iM \quad (11)$$

That one of the M calculated metrics $me^i(Z_{n+1}^q)$ which has the smallest value is determined by means of a comparison step ("COMPARE"). This becomes the minimal metric $Me(Z_{n+1}^q)$ of the target state $Z_{n+1}^q$ considered.

That precursor state of the M possible precursor states $Z_n^{i1}, Z_n^{i2}, \ldots, Z_n^{iM}$ which is the initial point of the transition to the state $Z_{n+1}^q$ with the minimum metric $Me(Z_{n+1}^q)$ is selected by means of a selection step ("SELECT"), that is to say the index i, denoted as i(q) is determined for which it holds that $me^i(Z_{n+1}^q) = Me(Z_{n+1}^q)$. The correct precursor state is thereby determined. The corresponding path is lengthened into the state $Z_{n+1}^q$, while the paths, which lead to the remaining precursor states are not further tracked.

These three steps are known as an ACS (Add-Compare-Select) operation. In descriptive terms, the path from which the previously received data with the highest probability come is established in the course of an ACS operation for each state relative to the time step n+1. Only this path ("survivor") is progressed, that is to say still taken into account at the next ACS operation. The discarding of possible paths, which is practiced in each step is the basis of the capability of the VA to solve MLSE in terms of outlay.

This known application of the VA in demodulating a CPFSK signal is possible only for rational modulation indices. In the case of an irrational modulation index, an infinitely large number of states per time step would result, for which reason the trellis could not be realized and implemented.

The TST demodulation according to the invention of a CPFSK signal is not based on any prescribed replacement symbol modulation alphabet, but a replacement symbol (transmitter state) one time step back (the (n-1)th one) occurring during the modulation is estimated at the receiver end in the subsequent (nth) time step. The transmitter state is "corrected" in the receiver.

This mode of procedure permits the MLSE of a CPFSK-modulated signal to be carried out on the basis of combined transmitter and channel states, which no longer contain the accumulated phase. The states are allocated such that only the last L input data symbols are taken into account in accordance with the ISI present. Consequently, the ith state of the trellis diagram on which the MLSE according to the invention is based is described in general by the L-tuple $Z_n^i = (Z_n^{L-1,(1)}, \ldots, Z_n^{1,(i)}, Z_n^{0,(i)}$, the variables $Z_n^{L-1,(i)}, \ldots, Z_n^{1,(i)}, Z_n^{0,(1)}$ now being capable of assuming the possible values of the input data symbols $d_n$, i.e. $\{1, -1\}$.

The actual channel state, unknown in the receiver, relating to the time step n is given by the L-tuple $D_n = (d_{n-L}, \ldots, d_{n-2}, d_{n-1})$.

Carrying out an ACS operation in the way according to the invention is explained below for the example of L=2. $\hat{r}_n^{(1)}$ denotes the undisturbed, reconstructed signal relating to the time step n in the state with the index i, that is to say $Z_n^i$. In accordance with equation (9), it holds the:

$$\sum_{l=0}^{L} a_{n-l} \hat{h}_l \stackrel{L=2}{=} a_n \hat{h}_0 + a_{n-1} \hat{h}_1 + a_{n-2} \hat{h}_2$$

$$= a_{n-1} e^{j\pi\eta d_n} \hat{h}_0 + a_{n-1} \hat{h}_1 + a_{n-1} e^{j\pi\eta(-d_{n-1})} \hat{h}_2$$

that is to say $$\hat{r}_n^{(i)} = \sum_{l=0}^{L} a_{n-l}^{(i)} \hat{h}_l \quad (12)$$

$$= a_{n-1}^{(i)} e^{j\pi\eta d_n^{(i\to q)}} \hat{h}_0 + a_{n-1}^{(i)} \hat{h}_1 + a_{n-1}^{(i)} e^{j\pi\eta(-z_n^{0,(i)})} \hat{h}_2$$

$$= a_{n-1}^{(i)} \left(e^{j\pi\eta d_n^{(i\to q)}} \hat{h}_0 + \hat{h}_1 + e^{j\pi\eta(-z_n^{0,(i)})} \hat{h}_2\right)$$

$a_{n-1}^{(i)}$ denoting the replacement symbol assigned to the ith transmitter state, and $d_n^{(i\to q)}$ denoting that input data symbol which in relation to the time step n leads from the precursor state with index i into the target state with index q. Since the state description in the case of the MLSE according to the invention no longer is performed with the aid of the replacement symbols, $a_{n-1}^{(i)}$ is unknown a priori in the receiver (in the case of the previously described conventional VA, $a^{-1(i)} = Z_n^{0,(i)}$ would be prescribed by the precursor state considered).

An estimated value for $a_{n-1}^{(i)}$ is therefore determined in the receiver. The estimated value is denoted as $\hat{a}_{n-1}^{(i)}$. The principle of facilitating an MLSE on the basis of a state description by means of input data symbols by determining an estimated value $\hat{a}_{n-1}^{(i)}$ for $a_{n-1}^{(1)}$ is a fundamental aspect of the TST.

After the determination of an estimated value $\hat{a}_{n-1}^{(i)}$ for $a_{n-1}^{(i)}$, the undisturbed, reconstructed signal is used in accordance with equation (12) together with the (disturbed) received signal $y_n$ to calculate a transition metric value $$I(Z_n^i, y_n) = \left(y_n - \hat{r}_n^{(i)}\right)^2$$

The determination of the estimated value $\hat{a}_{n-1}^{(i)}$ can be performed in a simple way on the basis of the estimated value $\hat{a}_{n-2}^{(1)}$ determined for the previous time step: the transmitter state is corrected, as it were.

A first possibility for this consists in assuming by way of simplification that $a_{n-1}^{(i)}$ is identical for all states i (in the same time step), that is to say only a single "generalized" transmitter state need be estimated for each time step. This can be performed in accordance with $$\hat{a}_{n-1}^{(i)} = \hat{a}_{n-1} = \hat{a}_{n-2} \exp\{j\pi\eta \hat{d}_{n-1}\} \qquad (14)$$

$\hat{d}_{n-1}$ being a (provisional) value, generated by means of a DFE technique, for example, for the reconstructed input data symbol $d_n$. An equalizer with quantized feedback, what is termed DF (Decision Feedback) equalizer, is suitable for carrying out such a method.

A second possibility for calculating the estimated values $\hat{a}_{n-1}^{(1)}$ for $a_{n-1}^{(1)}$ from $\hat{a}_{n-2}^{(1)}$ is yielded by the relationship:

$$\hat{a}_{n-1}^{(i)} = \hat{a}_{n-2}^{(i)} \exp\{j\pi\eta \hat{d}_{n-1}\} \qquad (15)$$

Again, the DFE technique can be used to determine a value for $\hat{d}_{n-1}$.

A third possibility consists in determining the estimated values $\hat{a}_{n-1}^{(i)}$ on the basis of the already mentioned PSP method.

The PSP method is described in U.S. Pat. No. 5,432,821 and is incorporated in the present document by reference. The PSP method is based in general on generating an estimated value for a variable unknown at the receiver end and assigned to a specific state on the basis of information (already present in the receiver) on the path, which leads to this state.

The determination of $\hat{a}_{n-1}^{(i)}$ using the PSP method can therefore be described in general form by the equation $$\hat{a}_{n-1}^{(i)} = G(S(Z_n^i)) \qquad (16)$$

Here, $S(Z_n^i)$ is the sequence, assigned to the path $P(Z_n^i)$ (that is to say that path P which ends in the state in relation to the time step n) of already decided input data symbols which is denoted below by $$S(Z_n^i) = \left(d_0^{P(Z_n^i)}, d_1^{P(Z_n^i)}, \ldots, d_{n-1}^{P(Z_n^i)}\right) \qquad (17)$$

$G(\cdot)$ denotes an estimator which assigns an estimated value to such a sequence of decided input data symbols.

A more special form of the PSP method for determining $\hat{a}_{n-1}^{(i)}$ is specified by the expression $$\hat{a}_{n-1}^{(i)} = \hat{a}_{n-2}^{(i)} \exp\{j\pi\eta G(S(Z_n^i))\} \qquad (18)$$

A simple example for $G(\cdot)$ in this case is:

$$G(S(Z_n^i)) = d_{n-1}^{P(Z_n^i)} = z_n^{0,(i)} \qquad (19)$$

That is to say $$\hat{a}_{n-1}^{(i)} = \hat{a}_{n-2}^{(i)} \exp\left\{j\pi\eta d_{n-1}^{P(Z_n^i)}\right\} \qquad (20)$$

The PSP method can be used to determine further parameters unknown in the receiver. Reference is made in this connection to the fact that the application of the TST demodulation method described above depends sensitively on how accurately the modulation index η of the transmitter is known in the receiver. The modulation index used in the receiver for demodulation is denoted below by $\tilde{\eta}$. Slight deviations between the modulation index $\tilde{\eta}$ and the modulation index η set at the receiver end are enough in themselves to lead to substantial losses in the efficiency of the TST algorithm. The reason for this is that a deviation Δη in the modulation index assumed at the transmitter end with respect to the true modulation index η (that is to say $\tilde{\eta}$= η+Δη) in relation to the time step n set a phase error $\Delta\phi_n^{(\tilde{\eta})}$ in accordance with the relationship $$\Delta\phi_n^{(\tilde{\eta})} = \pi\Delta\eta \sum_{k=0}^{n} d_k \qquad (21)$$

The phase error $\Delta\phi_n^{(\tilde{\eta})}$ is therefore a function of the transmitted data sequence $(d_0, d_1, \ldots, d_{n-1})$. In accordance with equation (12), this phase error acts on the undisturbed, reconstructed signal.

For the case wherein the frequency modulation is undertaken, as illustrated in FIG. 2, relative to a carrier frequency $f_0$, and at the receiver end the shift by the carrier frequency is nullified by mixing downward, a frequency offset can occur between the carrier frequency $f_0$ of the transmitter and a frequency $f'_0$ which is used for mixing downward. This frequency offset, or else a drift one of the two frequencies, likewise act as phase error in the undisturbed, reconstructed signal. For example, a constant frequency offset $\Delta f = f_0 - f'_0$ leads to a phase error of a linear profile:

$$\Delta \phi_n^{(\Delta f)} = 2\pi \cdot \Delta f \cdot n \cdot T \qquad (22)$$

The phase between the reconstructed signal (see equation 12) and the receive signal $y_n$ is determined in accordance with $$\hat{\phi}_n^{(i)} = -\arg(\hat{r}_n^{(i)} \cdot y_n^*) \qquad (23)$$

in order to determine the phase error. In this case, "arg" denotes the angle of a complex number in radian measure and "*" denotes the complex conjugate with the complex number provided with the asterisk.

The phase error $\phi_n^{(i)}$ is used in the following way for phase correction of the undisturbed, reconstructed signal $\hat{r}_n^{(i)}$:

$$\hat{a}_{n-l,corrected}^{(i)} = G(S(Z_n^i)) \cdot \exp(j\hat{\phi}_n^{(i)}) \qquad (24)$$

that is to say Gl. 12

$$\hat{r}_{n,corrected}^{(i)} = \hat{r}_n^{(i)} \cdot \exp(j\hat{\phi}_n^{(i)}) \qquad (25)$$

being yielded in accordance with equation 12.

A phase error $\phi_n^{(i)}$ likewise forms an unknown parameter in the VA. A data based estimate of this unknown parameter can likewise be realized with the PSP method. That is to say for each path ("survivor") within the trellis diagram the input data symbol decisions made for this path are used to estimate this unknown parameter by analogy with equations 16, 17. The unknown parameter is estimated after each time step, and updating of it is performed. The updated estimated value of the unknown parameter (phase error $\phi_n^{(i)}$ is then used, as already described, for the next calculation of a transition metric value.

In order to obtain estimated values for the phase errors, the phase errors, which were determined for the individual states, are filtered. It is possible, for example, to use as filter an IIR filter of first order, the filtered estimated value for the state with the index i in relation to the nth time stamp being yielded in accordance with the following relationship:

$$\theta_n^{(i)} = \beta_1 \hat{\phi}_n^{(i)} + \beta_2 \hat{\phi}_{n-1}^{(i)} \qquad (26)$$

$\beta_1$ and $\beta_2$ denoting suitably selected filter constants in this case.

Figure 7:
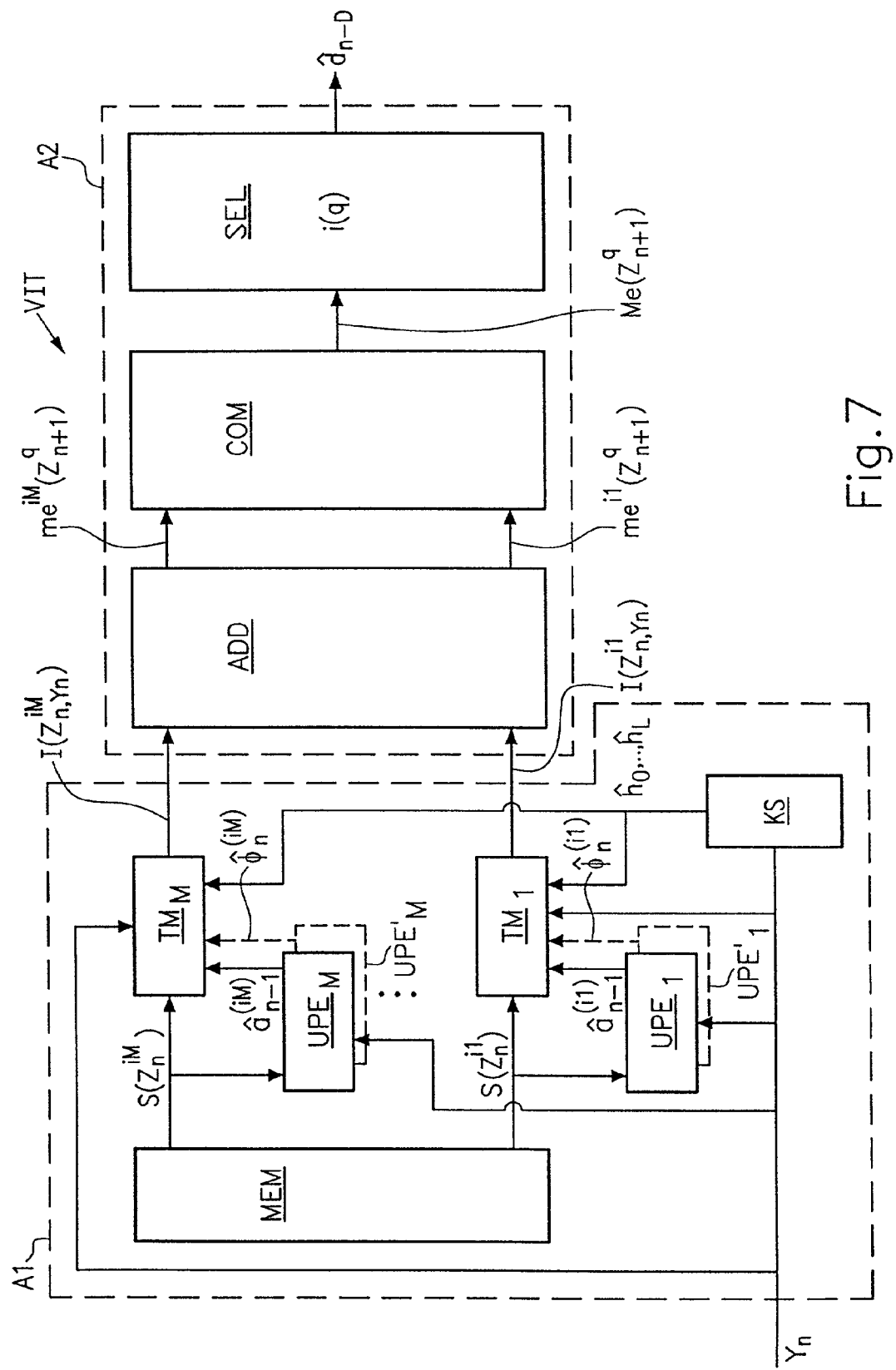
FIG. 7 is a simplified block diagram of a Viterbi decoder, designed for the PSP method.

FIG. 7 shows a block diagram of a device according to the invention for carrying out the TST-MLSE. The PSP method is used in this example both to determine the first estimated values (for the replacement symbols) and to determine the second estimated values (for the phase errors).

Figure 3:
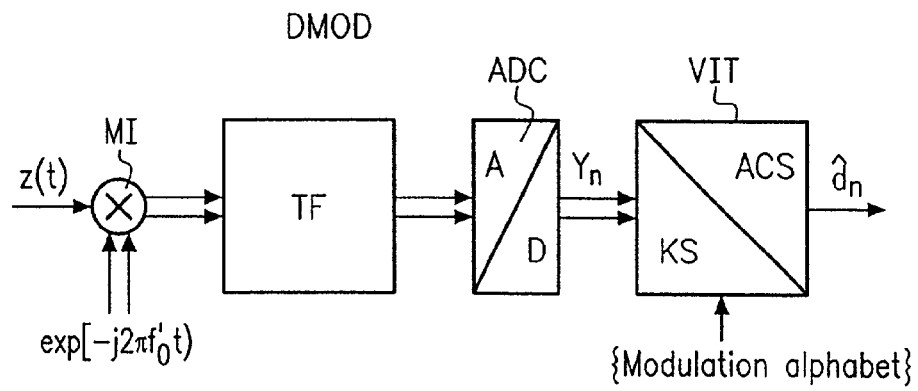
FIG. 3 is a block diagram explaining the basic structure of a coherent CPFSK modulator.

As illustrated in FIG. 3, the Viterbi equalizer VIT accepts the complex samples $y_n$ and outputs the estimated input data symbols $\hat{a}_n$ with a demodulation delay D. On the one hand, the equalizer VIT comprises a section A2 for carrying out the ACS operations. The section A2 comprises a first unit ADD for calculating the metric values, a second unit COM, wherein a comparison of the updated metrics is undertaken, and a third unit SEL, which carries out the selection operation, that is to say progresses that path into the target state considered for which the smallest metric has been determined in the second unit COM.

On the other hand, the equalizer VIT comprises a first calculating section A1, which is connected upstream of the second calculating section A2 in the signal path. The first calculating section A1 comprises a channel estimator KS, M unknown-parameter estimators $UPE_1, \ldots, UPE_M$, M calculating sections $TM_1, \ldots, TM_M$ for calculating transition metric values, and a path memory MEM.

The channel estimator KS calculates the estimated channel parameters $\hat{h}_0, \ldots, \hat{h}_L$ and communicates them to the calculating sections $TM_1, \ldots, TM_M$ for calculating the transition metric values.

Sequences of decided input data symbols $S(Z_n^1)$ with reference to all paths tracked in the trellis diagram are stored in the path memory MEM. Their number corresponds to the state considered in the trellis diagram, that is to say is equal to M or greater. The sequences of decided input data symbols are updated in relation to each time step.

The mode of operation of the Viterbi equalizer VIT is considered below with reference to the prescribed target state $Z_{n+1}^q$. The unknown-parameter estimators $UPE_1, \ldots, UPE_M$ are fed from MEM over sequences of decided input data symbols assigned to the possible precursor states of the state considered. The unknown-parameter estimators $UPE_1, \ldots, UPE_M$ estimate for each path of the state $\hat{a}_{n-1}^{(i1)}, \ldots, \hat{a}_{n-1}^{(iM)}$ of the transmitter relative to a preceding time step, and communicate the estimated values to the calculating sections $TM_1, \ldots, TM_M$ for the calculation of the transition metric values. The estimated values for the replacement symbols (that is to say the path-referred transmitter states) are determined in the tracking mode in accordance with equation 18.

The transition metric values $I(Z_n^{i1}, Y_n), \ldots, I(Z_n^{iM}, Y_n)$ calculated in the calculating sections $TM_1, \ldots, TM_M$ are fed to the addition unit ADD and further processed in the already described way in the units COM and SEL. After the ACS operations have been carried out relative to all target states relating to the time step n+1, the paths (survivors) are determined for this time step.

The Viterbi equalizer VIT can also be designed in terms of circuitry (in a way not illustrated) such that the ACS operations are carried out in parallel for all target states.

In order to estimate the phase errors of the undisturbed, reconstructed signals, further unknown-parameter estimators $UPE'_1, \ldots, UPE'_M$ are present which undertake an estimation of the respective phase errors in accordance with equations 21 and 23 and/or 26. The estimated phase errors or estimated filtered phase errors are communicated to the calculating sections $TM_1, \ldots, TM_M$. The efficiency of the TST method is substantially raised by taking account of these phase errors (in accordance with equations 24 and 25, similarly in the case of the fundamental use of filtered estimated phase errors) in the calculation of the transition metric values in the calculating sections $TM_1, \ldots, TM_M$.

It may be pointed out in conclusion that it is also possible to provide a DF equalizer as an alternative to the Viterbi equalizer VIT, shown in FIG. 7, which determines unknown parameters on the basis of a PSP method.

What is claimed is:

1. A method of estimating a sequence of input data symbols of a CPFSK-modulated data signal, transmitted via a faulty channel, which comprises:
   repeatedly executing an ACS operation and thereby calculating a transition metric value with reference to a transition from a precursor state at a time step n to a target state at a time step n+1, by
   determining a first estimated value for a replacement symbol, occurring in a linear approximation of the CPFSK, with reference to an n−1th time step, and
   taking the first estimated value into account in a calculation of the transition metric value.

2. The method according to claim 1, which comprises determining the first estimated value by using the first estimated value determined in a preceding time step.

3. The method according to claim 1, which comprises separately determining the first estimated value for each precursor state, specifically on a basis of decisions on input data symbols taken on the path ($P(Z_n^i)$) leading to the respective precursor state ($Z_n^i$).

4. The method according to claim 3, which comprises determining the first estimated value using the equation $$\hat{a}_{n-1}^{(i)} = \hat{a}_{n-2}^{(i)} \exp\left\{j\pi\eta d_{n-1}^{P(Z_n^i)}\right\},$$

whereby $\hat{a}_{n-1}^{(i)}$ and $\hat{a}_{n-2}^{(i)}$ are the first estimated values for the n−1th and n−2th replacement symbol, respectively, relating to the precursor state with index I, $$d_{n-1}^{P(Z_n^1)}$$

is an input data symbol, decided in a receiver, with reference to a path leading to the respective precursor state $Z_n^i$, and η denotes the modulation index.

5. The method according to claim 1, which comprises determining a second estimated value for a phase correction of a reconstructed signal value determined for calculating the transition metric value by using the first estimated value, and considering the second estimated value in calculating the transition metric value.

6. The method according to claim 5, which comprises separately determining a second estimated value for each precursor state, specifically on a basis of decisions on input data symbols taken on the path ($P(Z_n^1)$) leading to the respective precursor state ($Z_n^i$).

7. The method according to claim 5, wherein the step of determining the second estimated value comprises calculating a phase difference between a reconstructed signal value and a value of the received data symbol.

8. A device for estimating a sequence of input data symbols of a CPFSK-modulated data signal transmitted via a faulty channel, comprising:
   a device configured to carry out ACS operations;
   a calculating unit for calculating a transition metric value with reference to a transition from a precursor state at a time step n to a target state at a time step n+1, and
   estimating means for determining a first estimated value for a replacement symbol, occurring in a linear approximation of a CPFSK, with reference to an n−1th time step, said estimating means being connected to said calculating unit for communicating the first estimated value to said calculating unit.

9. The device according to claim 8, wherein said estimating means is configured to carry out the determination of the first estimated value by using the first estimated value determined in a preceding time step.

10. The device according to claim 8, wherein
    said estimating means comprises a multiplicity of calculating sections, and
    each calculating section is configured to carry out a separate calculation of a first estimated value for the n−1th replacement symbol on the basis of decisions taken on input data symbols for a path ($P(Z_n^i)$) leading to the respective precursor state ($Z_n^i$) under consideration.

11. The device according to claim 10, wherein each said calculating section is configured to carry out the calculation of the first estimated value using the equation $$\hat{a}_{n-1}^{(i)} = \hat{a}_{n-2}^{(i)} \exp\left\{j\pi\eta d_{n-1}^{P(Z_n^i)}\right\},$$

where $\hat{a}_{n-1}^{(i)}$ and $\hat{a}_{n-2}^{(i)}$ respectively are the first estimated values for the n−1th and n−2th replacement symbols relating to the output state of index i, $$d_{n-1}^{P(Z_n^1)}$$

is an input data symbol decided in a receiver with reference to the path leading to the precursor state ($Z_n^i$) under consideration, and η denotes the modulation index.

12. The device according to claim 8, wherein said estimating means are first means and the device further comprises second means for determining a second estimated value for a phase correction of a reconstructed signal value determined for calculating the transition metric value by using the first estimated value.

13. The device according to claim 12, wherein
    said second means comprise a multiplicity of calculating sections; and
    each calculating section is configured to carry out a separate calculation of a second estimated value for the n−1th replacement symbol on a basis of decisions taken on input data symbols for the path ($P(Z_n^i)$) leading to the respective precursor state ($Z_n^i$) under consideration.

* * * * *